Patented July 23, 1929.

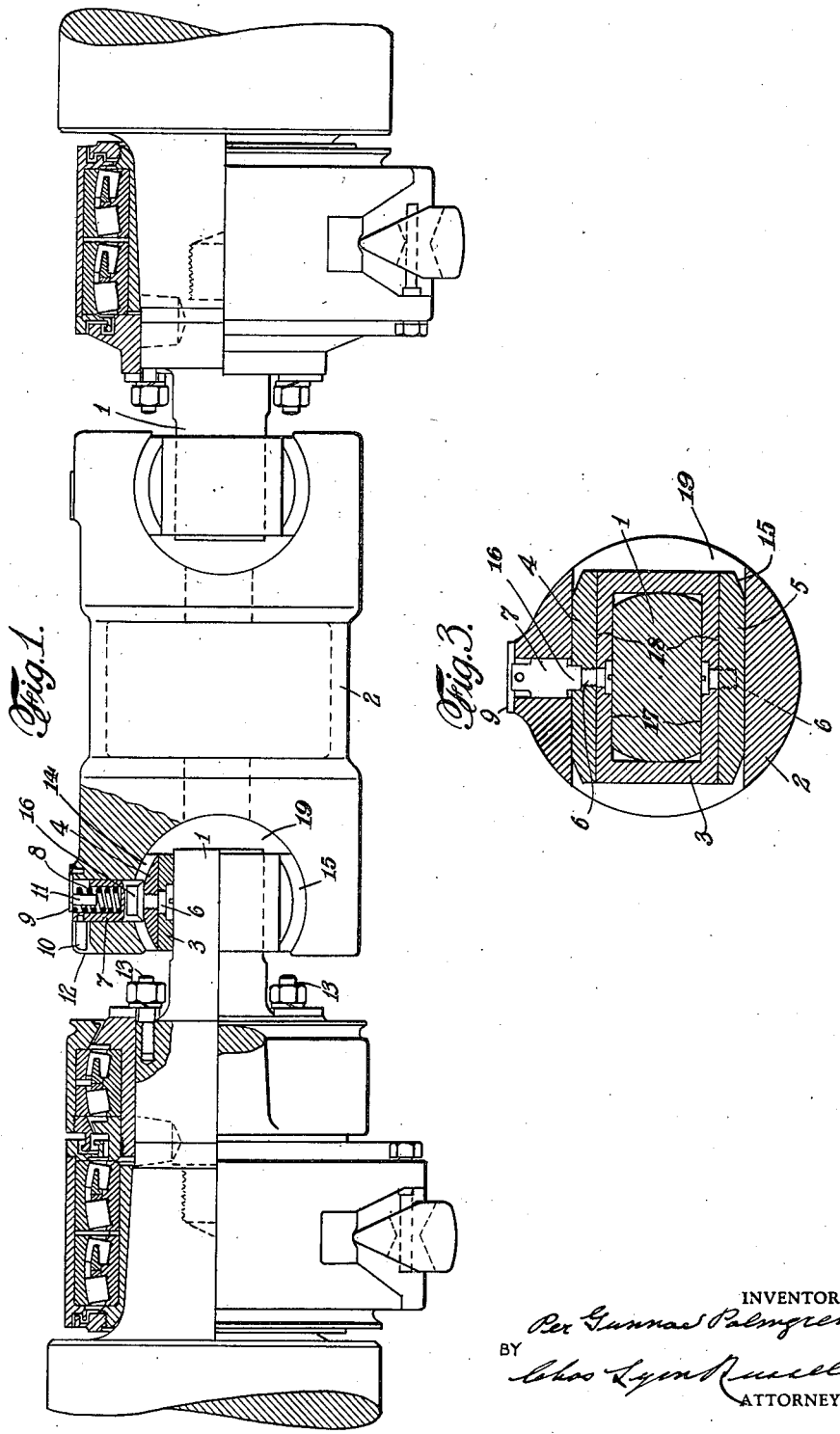

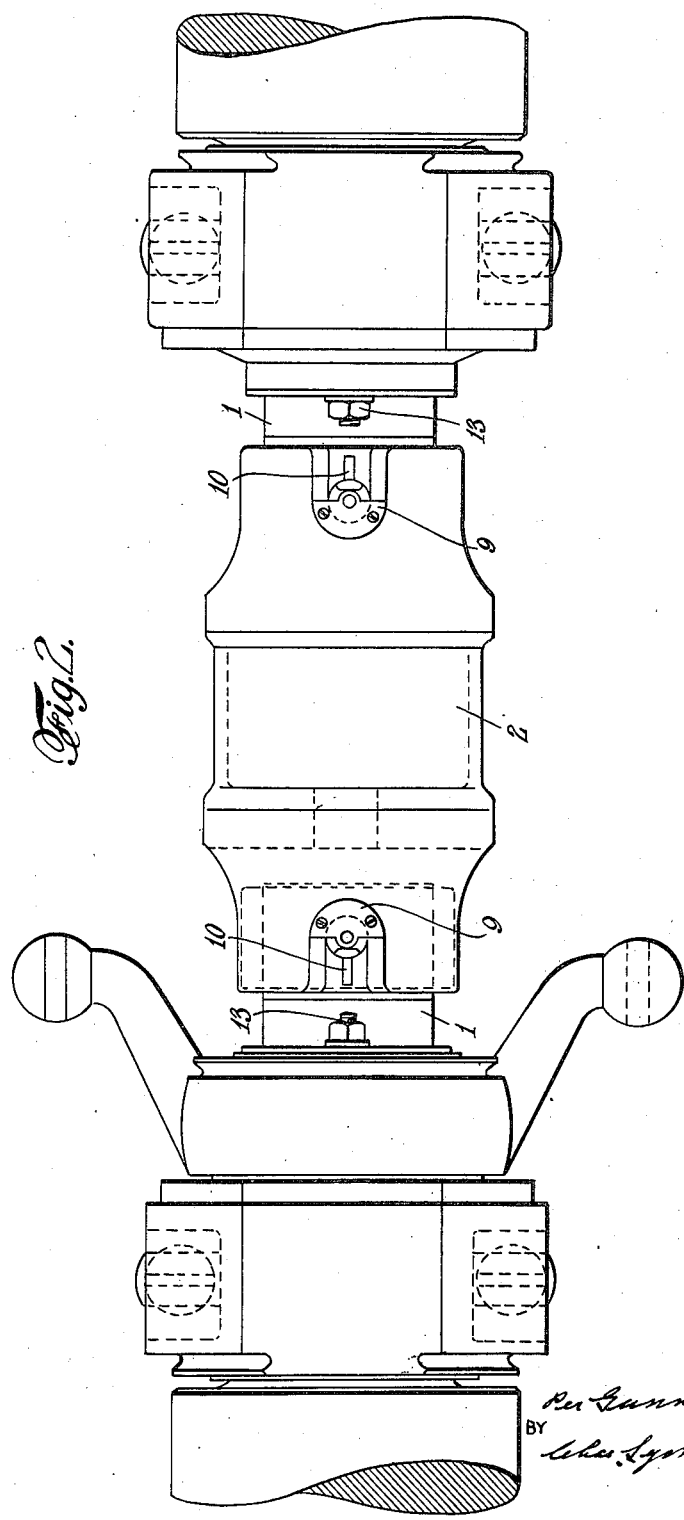

1,722,251

UNITED STATES PATENT OFFICE.

PER GUNNAR PALMGREN, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

COUPLING BOX FOR ROLLING MILLS.

Application filed April 8, 1927, Serial No. 181,983, and in Sweden April 13, 1926.

The couplings used in rolling mills for connecting the rolls must be so arranged that the rolls can be raised and lowered independently of each other. The coupling boxes ordinarily employed are, therefore, so formed that there is play between the coupling box and the neck of the roll and between the coupling box and the driving bar. Due to this play, the turning effort can be transmitted to the neck of the roll by the driving bar even if the latter is not parallel with the roll.

However, this construction entails certain well-known disadvantages. A consequence of the play in the coupling box is that the coupling might drive a roll at a varying speed so that at a given moment the roll may be moving faster than the co-acting roll which may be driven by a coupling connected with the drive side of the mill and be rotating at the same speed as the rolling mill in general. If at such a moment a blank is inserted between the rolls, the end of the blank will be bent, owing to the momentary difference between the speeds of the rolls. The faster moving roll will be subjected to a braking action which will cause a heavy shock in the coupling when the roll is again positively rotated by the driving means. These shocks often result in breakage of the driving bars and coupling boxes. This disadvantage is more noticeable in heavy mills. In order to avoid these difficulties it is usual to tighten the bearings to such an extent that a braking action is obtained, this braking action being sufficient to prevent the rolls from revolving at a momentarily increased speed.

When roller bearings are employed for the necks of the rolls, the rolls revolve so freely that the difficulties described above will be particularly noticeable. If separate brakes were arranged on the rolls the same effect could be obtained as that provided by tightening the plain bearings, but naturally such an arrangement would reduce the advantages to be gained by using roller bearings.

The object of the present invention is to overcome the disadvantages referred to and in cases where roller bearings are used to overcome these disadvantages without reducing the benefits obtained by the use of such bearings. More particularly the object of the invention is to provide a coupling which will transmit rotary motion from one to the other of two members connected by the coupling even though said members may not always be in axial alignment and at the same time enable one member always to be positively driven by the other ember.

The coupling according to the present invention comprises, in combination, a coupling box having a recess or recesses extending substantially at right angles to the axis of rotation of the coupling, said recess or recesses being circular in cross-section and open towards the outer end of the coupling box, blocks inserted in the said recesses and fitting to the same, and roll necks faced off at two opposite places and inserted in the ends of the coupling box to form with the same a universal joint.

In the drawing, Fig. 1 is a side view of a coupling according to a preferred embodiment of the invention. Fig. 2 is a top view of the same, and Fig. 3 is a section of the end of the roll neck and the surrounding parts of the coupling box.

Referring to the drawing, the roll neck ends 1 (Figs. 1 and 3) are shown inserted in the ends of a coupling box 2. Each of the roll necks, 1, is shown faced off at two opposite sides, 17, and carrying a sleeve, 3, having flat sides, 18, engaging the faced-off sides, 17, of the roll neck. Blocks, 4, 5, are shown having flat faces mounted upon the flat face, 18, of the box, 3, the blocks being formed on the outer sides with cylindrical faces fitting the cylindrical recess, 19, at the end of the coupling box. Each of these blocks is shown provided with a tapering end, 15, for permitting ready insertion into the end of the recess, 19. And in the center portion of the block, 4, there is formed a transverse groove, 14, the bottom of the groove preferably conforming to the curvature of the outer portion of the block. The sleeve, 3, is shown formed on its flat sides, 18, with co-axial holes in which are mounted screws, 6, the screws having screw threaded connection with the blocks, 4 and 5, and forming pivots for the plates, 3 and 4, so that they may rotate about the center line of the screws, 6. It will thus be seen that the plates are prevented from leaving their place on the box, but are free to rotate about this axis.

There is shown placed in the wall of the coupling box a dowel pin, 7, the end, 16, of which is faced off on two opposite sides for fitting the groove, 14, formed in the block, 4, whereby the sleeve 3 is retained in position in the recess, 19, and also retained in position upon the roll neck, 1, but is permitted to oscillate in relation to the coupling box 2 upon an axis perpendicular to the axis through the screws, 6.

The dowel pin, 7, is shown bored out in its center, forming a chamber in which is placed a spring, 8, which presses at its outer end against the cover, 9, fastened to the coupling box serving to keep the dowel pin, 7, seated in the groove, 14, of the block, 4.

Arranged in the part of the dowel pin projecting beyond the coupling box is a pin 10 by means of which the dowel pin 7 can be lifted out of the groove, 14, when the coupling box is to be removed. For this purpose the dowel pin 7 is provided at its outer end with a recess in which the cover 9 can enter, when the dowel pin is lifted up. When the dowel pin 7 is lifted by means of the pin 10 to such an extent that the pin 10 comes outside the outer wall of the coupling box, the dowel pin can be turned so that the pin rests against the outer side of the coupling box and retains the dowel pin in its raised position. The coupling box can then be pushed to one side whilst the sleeve 3 and the blocks 4, 5 remain on the roll neck. For the guiding of the spring 8, the cover 9 is provided with a centre pin 11. Under normal conditions, the pin 10 rests in a recess 12 on the coupling box.

In addition to the simplicity of the construction, the arrangement described has the advantage that, owing to the facing-off of the roll neck ends on two sides, there will be sufficient space for screws 13 by means of which the roll neck bearings can be fastened on the roll neck in a simple manner. Moreover, the arrangement requires less longitudinal space between the rolls than in prior designs, and this circumstance entails appreciable advantages, such as making it possible to give the roll necks the greater length required for the roller bearings without it being necessary to move the stands farther apart.

I claim:

1. A coupling for rolling mills and the like comprising, in combination, a coupling box having a recess extending substantially at right angles to the axis of rotation of the coupling, said recess being circular in cross-section and open towards the outer end of the coupling box, the roll neck being faced off at two opposite sides and inserted in the recess in the box, a flat sided sleeve being mounted upon the faced off neck and a pair of blocks rotatorily mounted on the sleeve and fitting the said recess whereby a universal joint is formed between the roll neck and the box.

2. Arrangement according to claim 1 for retaining the coupling box on the roll neck, characterized by one of the blocks being formed with a groove, a dowel pin adapted to seat in said groove and a spring engaging the pin for holding it in position.

3. Arrangement according to claim 1 for retaining the coupling box on the roll neck, characterized by one of the blocks being formed with a groove, a dowel pin adapted to seat in said groove and a spring engaging the pin for holding it in position, the dowel pin being provided with a pin whereby it may be lifted out of mesh with the block and brought to rest against the outer side of the coupling box.

4. A coupling for rolling mills and the like comprising, in combination, a coupling box having a recess at each of its two ends extending substantially at right angles to the axis of rotation of the coupling, said recesses being circular in cross-section and open towards the outer end of the coupling box, the roll necks being faced off at two opposite sides and inserted in the recesses in the box, a flat sided sleeve being mounted upon each of the faced off necks and a pair of blocks rotatorily mounted on each sleeve and fitting one of the said recesses whereby a universal joint is formed between the roll neck and the box.

In testimony whereof I have signed my name.

PER GUNNAR PALMGREN.